(12) United States Patent
Shah et al.

(10) Patent No.: US 9,923,771 B2
(45) Date of Patent: Mar. 20, 2018

(54) ADAPTIVE BITRATE MODIFICATION OF A MANIFEST FILE

(71) Applicant: CISCO TECHNOLOGY, INC., San Jose, CA (US)

(72) Inventors: Jigar Shah, San Jose, CA (US); Peter Zhu, Cupertino, CA (US); Jayaraman Iyer, San Jose, CA (US); Bhaskar Bhupalam, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 14/156,124

(22) Filed: Jan. 15, 2014

(65) Prior Publication Data

US 2015/0201042 A1 Jul. 16, 2015

(51) Int. Cl.
| | | |
|---|---|---|
| *G06F 15/16* | (2006.01) | |
| *H04L 12/24* | (2006.01) | |
| *H04L 29/06* | (2006.01) | |
| *H04L 29/08* | (2006.01) | |

(52) U.S. Cl.
CPC ...... *H04L 41/0893* (2013.01); *H04L 65/4084* (2013.01); *H04L 65/60* (2013.01); *H04L 65/605* (2013.01); *H04L 67/322* (2013.01)

(58) Field of Classification Search
CPC .......... H04N 21/2662; H04N 21/23439; H04L 65/4084; H04L 47/25; H04L 41/0893; H04L 67/322; H04L 65/605; H04L 65/60
USPC .................................................. 709/219, 203
See application file for complete search history.

(56) References Cited

U.S. PATENT DOCUMENTS

| | | | |
|---|---|---|---|
| 8,484,358 B2 | 7/2013 | Swenson et al. | |
| 2009/0310668 A1* | 12/2009 | Sackstein | ....... H04N 21/234354 375/240.01 |
| 2011/0060792 A1* | 3/2011 | Ebersviller | ............ H04N 19/46 709/203 |

(Continued)

FOREIGN PATENT DOCUMENTS

| | | |
|---|---|---|
| EP | 2587825 | 5/2013 |
| WO | WO 87/03977 A1 | 7/1987 |

(Continued)

OTHER PUBLICATIONS

"Building an application around Zencoder, Part 1: Using WebSockets for notifications"; http://blog.zencoder.com/page/3/, May 28, 2013, pp. 1-5.

*Primary Examiner* — Anthony Mejia
*Assistant Examiner* — Kristoffer S Sayoc
(74) *Attorney, Agent, or Firm* — Merchant & Gould P.C.

(57) ABSTRACT

A system includes a media optimizer that adaptively generates and transmits a modified manifest file based on an original manifest file corresponding to an associated media asset from a content provider in response to a media content request from a client for the associated media asset. The original manifest file specifies bitrates. The media optimizer extracts parameters associated with the media content request and applies bitrate policies based on the extracted parameters to adaptively modify the original manifest file to generate the modified manifest file. The media optimizer is further configured to transmit the modified manifest file to the client for selection by the client of a bitrate associated with delivery of the associated media asset.

19 Claims, 3 Drawing Sheets

(56) References Cited

U.S. PATENT DOCUMENTS

| | | | |
|---|---|---|---|
| 2011/0082924 A1* | 4/2011 | Gopalakrishnan | H04L 65/4084 709/223 |
| 2013/0058393 A1* | 3/2013 | Soroushian | H04N 21/234372 375/240.01 |
| 2013/0091249 A1 | 4/2013 | McHugh et al. | |
| 2013/0163430 A1 | 6/2013 | Gell et al. | |
| 2013/0254341 A1 | 9/2013 | Ramakrishnan | |
| 2015/0089557 A1* | 3/2015 | Busse | H04N 21/23439 725/95 |

FOREIGN PATENT DOCUMENTS

| | | |
|---|---|---|
| WO | WO 2012/175145 | 12/2012 |
| WO | WO 2013/001426 A1 | 1/2013 |
| WO | WO 2013/004260 | 1/2013 |
| WO | WO 2013/058684 | 4/2013 |

\* cited by examiner

ADAPTIVE BITRATE MODIFICATION OF A MANIFEST FILE

TECHNICAL FIELD

This disclosure relates to adaptive bitrate modification of a manifest file.

BACKGROUND

In addition to traditional over the air or cable broadcasts, a third party resource can provide broadband delivery of audio and video to one or more users via a network (e.g., the Internet). For instance, a service provider (e.g., an internet service provider (ISP)) can provide a client access to the network, such that the user can request and receive the video content from a third party content provider. The requested audio and video data thus can be delivered to the user as Over-The-Top (OTT) content. In the delivery of OTT content, the service provider generally is responsible only for transporting the IP packets that contains the content from the third party content provider. The delivery of the OTT content can be based on a bitrate that is selected by the client.

DESCRIPTION OF EXAMPLE EMBODIMENTS

Overview

This disclosure relates to adaptive bitrate modification of a manifest file.

One example embodiment includes a system. The system includes a media optimizer that adaptively generates and transmits a modified manifest file based on an original manifest file corresponding to an associated media asset from a content provider in response to a media content request from a client for the associated media asset. The original manifest file specifies bitrates. The media optimizer extracts parameters associated with the media content request and applies bitrate policies based on the extracted parameters to adaptively modify the original manifest file to generate the modified manifest file. The media optimizer is further configured to transmit the modified manifest file to the client for selection by the client of a bitrate associated with delivery of the associated media asset.

Another example embodiment includes a method. The method includes processing a media content request from a client for delivery of a media asset requested from a content provider. The method also includes retrieving an original manifest file comprising a plurality of bitrates associated with delivery of the media asset from the content provider via a network. The method also includes extracting parameters associated with the media content request and evaluating the parameters relative to a predetermined set of rules. The method also includes calculating at least one additional bitrate based on the evaluation of the parameters relative to the predetermined set of rules. The method also includes generating a modified manifest file that includes the at least one additional bitrate. The method further includes transmitting the modified manifest file to the client for selection by the client of a selected bitrate for delivery of the media asset requested from the content provider.

Another example embodiment can include a media optimizer apparatus. The media optimizer includes a network interface configured to receive a media content request corresponding to an associated media asset from a client and to access an original manifest file from a content provider that stores the associated media asset, the original manifest file specifying a plurality of bitrates for the associated media asset. The media optimizer also includes a policy manager. The policy manager can include a parameter extractor configured to extract parameters associated with the media content request. The policy manager can also include a rule evaluation engine configured to evaluate the extracted parameters based on a predetermined set of rules. The policy manager can also include a bitrate calculator configured to adaptively generate at least one additional bitrate based on the evaluation. The policy manager further can include a manifest file modification engine configured to add the at least one additional bitrate to the plurality of bitrates in the original manifest file to generate a modified manifest file. The policy manager can send the modified manifest file to the client via the network interface for selection by the client of a selected bitrate for delivery of the associated media asset requested from the content provider.

Example Embodiments

Figure 1:
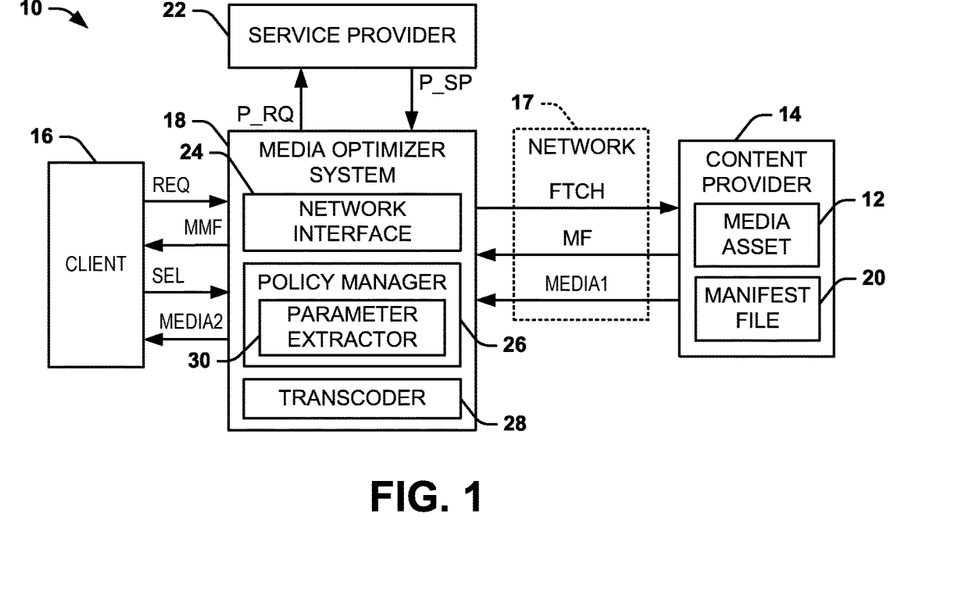
FIG. 1 illustrates an example of a network system.

FIG. 1 illustrates an example of a network system 10. The network system 10 can be implemented for delivering a media asset 12 that can be hosted at a resource location managed by a content provider 14 to a client 16 that is operated by a user. As an example, the client 16 can be configured as any of a variety of computer devices that can retrieve and play the media content for consumption by the user. As a further example, the client 16 can be a portable electronic device, such as operating on a cellular network, a tablet computer or smart-phone. Other examples of the client 16 can include a personal computer (PC) or any of a variety of network-connected media devices (e.g., set top boxes, gaming consoles, digital video recorder (DVR), digital video disc (DVD) player, Blu-Ray player, or any other such device). As yet another example, the client can be implemented as executable instructions stored in non-transitory memory and executable by a processor, such as corresponding to an adaptive bitrate (ABR) client. A given device can include any number of such clients and thus can implement different ABR formats depending on which client is being implemented to stream media content. The media asset 12 can include audio content, video content, audio and video content, as well as any other type of information that can digitized and stored in a given format that can be accessible by the client 16.

The content provider 14 can be any of a variety of one or more services that can host the media asset 12 on an origin server. The content provider 14 can be implemented as the resource location for the media content that is accessible by the client 16 via a network 17 (e.g., the Internet), such as via a web browser. Additionally, there can be any number of content providers 14 that can provide a plurality of different program offerings as respective media assets 12. For example, each content provider 14 can provide the content as a subscription-based service or it can be provided without requiring a subscription. In addition, the content provider 14 can be configured to generate and/or maintain an original manifest file 20 that defines a plurality of bitrates for delivery of the respective media asset 12 to the client 16, such as selectable by the client 16 according to an adaptive bitrate protocol. For example, the client 16 can be configured to download the original manifest file 20 from the content provider 14 prior to or in conjunction with requesting for blocks of data of the associated media asset 12. Thus, the client 16 can employ an adaptive bitrate client application to select a bitrate from those predefined in the original manifest file 20. For instance, the adaptive bitrate client application at the client can be configured to select the bitrate that best suits current network conditions and characteristics of the client 16 to optimize the user experience with respect to buffering delays and resolution while maintaining a most efficient delivery of the media asset 12.

The network system 10 also includes a media optimizer system 18 that can be associated with or otherwise work in conjunction with a web service provider 22 (e.g., an Internet service provider (ISP)). For example, the media optimizer system 18 can be located at a premises of the service provider 22 or another location (e.g., coupled to a network gateway) to connect subscriber equipment with the network 17, such as including the Internet. That is, the service provider 22, which is associated with the media optimizer system 18, can provide connectivity of the client 16 to the network 17, and thus to the content provider 14. The media optimizer system 18 can be configured to receive a media content request REQ from the client 16 and to provide the requested media asset 12 to the client 16 via the network 17 (demonstrated in the example of FIG. 1 as a signal MEDIA). As disclosed herein, the media content request REQ can correspond to a request from the client 16 to initiate data transfer of the media asset 12 to the client 16. For example, the media content request REQ can specify parameters and characteristics that are specific to the client 16 requesting the media asset 12, as opposed to feedback describing a previous (e.g., historical) transfer of the media asset 12 to one or more other clients that may have separately and independently requested the same media asset 12. As another example, the processing of the media content request REQ for the media asset 12 can be agnostic with respect to previous requests for and/or previous data transfers of the media asset 12 to other clients. In other examples, the feedback and or media requests from other clients can also be considered in conjunction with the media content request REQ from a particular client 12 as part of the optimization process for configuring the transfer of the media asset to such client 16

As disclosed herein, the media optimizer system 18 can be configured to transmit a modified manifest file, demonstrated in the example of FIG. 1 as a signal MMF, to the client 16 in response to the media content request REQ. The media optimizer can adaptively generate the modified manifest file based on the original manifest file 20 for the requested media asset. The original manifest file 20 can define a set of profiles for respective ABR streams corresponding to the requested media asset. The modified manifest file thus can provide the client 16 a greater variety of bitrates from which to select for better optimization of the delivery of the media asset 12 to the client 16.

In the example of FIG. 1, the media optimizer system 18 includes a network interface 24, a policy manager 26, and a transcoder 28. The network interface 24 can be implemented by the media optimizer system 18 as an interface with the network 17. The network interface 24 is configured to connect the client 16 and other network-enabled devices to the network 17 by transporting internet protocol (IP) packets between users (e.g., the client 16) and the network 17, enabling users to access network services such as including the content provider 14. Thus, the resulting stream of content provided from the content provider 14 can be delivered, for example, by the network interface 24 to the client 16 as over the top (OTT) data via the media optimizer system 18.

For example, the media content request REQ can be received at the network interface 24 from the client 16, and the network interface 24 can send the request on behalf of the requester to access the media asset 12 stored at the content provider 14 via the network 17. In the example of FIG. 1, in response to receiving the media content request REQ, the media optimizer system 18 transmits a request FTCH (e.g., as one or more IP packets) to the content provider 14 to access the original manifest file 20 associated with the respective media asset 12 that is identified in the media content request REQ. The request FTCH can also include a request for content corresponding to the requested media asset. In response, the content provider 14 transmits the original manifest file 20 to the media optimizer system 18, demonstrated in the example of FIG. 1 as a signal MF. As an example, the signal MF can correspond to transmission of the original manifest file 20 itself (e.g., as a transmitted ".txt" file or a document XML document), from which the predefined bitrates established by the content provider 14 can be accessed. Alternatively, in other examples, the signal MF can correspond to transmission of data that includes predefined bitrates that are saved in the original manifest file 20. For example, the signal MF can be configured as a Hypertext Transfer Protocol (HTTP), and can include the media content request REQ and/or data associated with the media content request REQ, which can include standard header data. As an example, the standard header data can include a uniform resource locator (URL) associated with the origin server of the content provider 14 that stores the media asset 12, as well as metadata that describes the media asset 12, including data specifying profiles for each of a plurality of available ABR streams.

The policy manager 26, in response to the media optimizer system 18 receiving the original manifest file 20, is configured to extract parameters associated with the media content request REQ and/or data associated with the client 16 and to apply bitrate policies based on the extracted parameters to adaptively modify the bitrates in the original manifest file 20 to generate the modified manifest file. As an example, the policy manager 26 can be configured to apply the bitrate policies based on the extracted parameters to adaptively generate at least one additional bitrate and/or delete at least one of the predefined bitrates in the original manifest file 20 (e.g., a highest bitrate). As another example, the policy manager 26 can also apply the bitrate policies based on information provided as feedback based on the transfer of the media asset to one or more other clients in addition to the extracted parameters and policies to adaptively generate the at least one additional bitrate and/or delete the at least one of the predefined bitrates in the original manifest file 20.

In the example of FIG. 1, the policy manager 26 includes a parameter extractor 30 that is configured to extract the parameters associated with the media content request REQ. As an example, the parameter extractor 30 can extract a first portion of the parameters from the media content request REQ, such as from a header of the media content request REQ (e.g., a user agent field). For example, the first portion of the extracted parameters can include data specifying one or more of a network access type (e.g., a mobile network access type, such as a 2.5G, 3G, 4G, or Wi-Fi network, or directly connected to a digital subscriber line), an adaptive bitrate type (e.g., Adobe HDS, Apple HLS, Microsoft Smooth Streaming (HSS), or a variety of other types), type of data optimization desired (e.g., online/dynamic/on-the-fly and/or offline/pre-positioned), and/or whether the content provider 14 is associated with and/or partnered with the service provider 22.

As another example, the parameter extractor 30 can extract a second portion of the parameters from the service provider 22. In the example of FIG. 1, the media optimizer system 18 is demonstrated as providing a parameter request P_RQ to the service provider 22, such as including the media content request REQ or data associated with the media content request REQ, such as data that identifies the client 16. In response, the service provider 22 provides a response P_SP that can provide data associated with the client 16 (e.g., including subscription and/or service information of the associated user of the client 16). As an example, the response can provide the data associated with the client 16 directly, or it can provide data that can be implemented by the media optimizer system 18 to enable the media optimizer system 18 to access the data associated with the client 16, such as via a database. For example, the second portion of the extracted parameters can include client capabilities (e.g., screen size, supported video resolution, etc.) and subscriber billing information (e.g., data rate and amount allowances, etc.). It is to be understood that the data that is described as part of first and second portions of the extracted parameters can be extracted from other sources, or in other combinations between the client 16 and the service provider 22, and are thus not limited to as described previously.

In response to extracting the relevant parameters via the parameter extractor 30, the policy manager 26 is configured to apply bitrate policies based on the extracted parameters to adaptively modify the original manifest file 20 (e.g., generate at least one additional bitrate). As an example, the policy manager 26 can evaluate the parameters relative to a predetermined set of rules, and can generate at least one additional bitrate based on the evaluation. Including at least one additional bitrate can provide a potentially more optimized bitrate for the delivery of the media asset 12 to the client 16. The policy manager 26 can thus add the at least one additional bitrate to the predefined bitrates in the original manifest file 20 to generate a modified manifest file MMF. As described herein, the modified manifest file can be either created by the media optimizer system 18, such as a ".txt" file or other data construct, based on the original manifest file 20 and the at least one additional bitrate. In other examples, the modified manifest file can be a version of the original manifest file 20 that has been modified by the media optimizer system 18. Thus, the modified manifest file can specify profiles for the same number of available streams or a different number of streams compared to the original manifest file 20.

As an example, the modified manifest file can be stored locally in a memory of the media optimizer system 18, such that the modified manifest file can include the predefined bitrates from the original manifest file 20, as well as each added bitrate. Therefore, the modified manifest file can provide a greater variety and number of available bitrates from which the client 16 can select for a more optimized delivery of the media asset 12 to the client 16. For example, in addition to adding the at least one additional bitrate to the predefined bitrates to generate the modified manifest file, the policy manager 26 can also delete one or more of the predefined bitrates from the original manifest file 20, such that the deleted bitrate(s) are not specified in the modified manifest file. Additionally, the policy manager 26 can be configured to provide an identifier of the at least one additional bitrate in the modified manifest file, such that the client 16 can identify which of the bitrates correspond to the predefined bitrates of the original manifest file 20 and which of the bitrates were generated by the policy manager 26.

Figure 2:
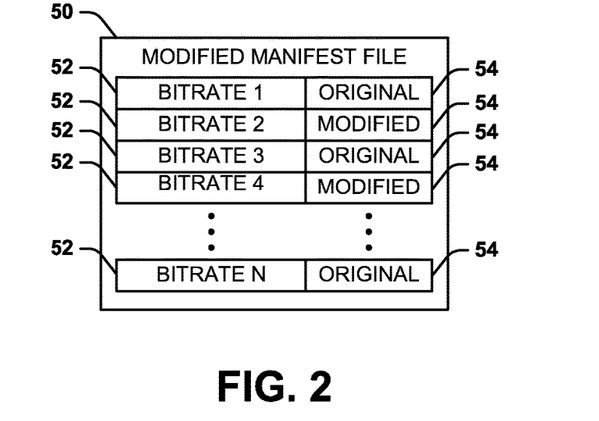
FIG. 2 illustrates an example of a modified manifest file.

FIG. 2 illustrates an example of a modified manifest file 50. The modified manifest file 50 can correspond to the modified manifest file that is generated by the policy manager 26 in the example of FIG. 1 and which is transmitted to the client 16. As an example, the modified manifest file 50 can be configured as a ".txt" file, such that the client 16 can access information about the bitrates by opening the modified manifest file 50.

The modified manifest file 50 includes a plurality N of designated bitrates 52, where N is a positive integer. The bitrates 52 can be organized in ascending or descending numerical order of bitrate, such as from a minimum at BITRATE 1 to a maximum at BITRATE N. The modified manifest file 50 also includes identifiers 54 for each of the bitrates 52 to specify whether the respective bitrate 52 was predefined in the original manifest file 20 or was generated by the policy manager 26. Thus, the client 16 is provided indication of whether a selected bitrate was predefined in the original manifest file 20 or was generated by the policy manager 26. As an example, where N=5, BITRATE 1 could be approximately 500 kb/s, BITRATE 3 could be approximately 1 Mb/s, and BITRATE N (i.e., 5) could be approximately 2 Mb/s, as defined in the original manifest file 20. Thus, BITRATE 2 and BITRATE 4 could be created by the policy manager 26 to provide a more granular variety of bitrates that can be selected by the client 16. For example, BITRATE 2 can be approximately 800 kb/s and BITRATE 4 can be approximately 1.5 Mb/s. As another example, the policy manager 26 can be configured to generate multiple bitrates between each of the predefined bitrates provided in the original manifest file 20, such as at predetermined intervals as dictated by the bitrate policies.

Referring back to the example of FIG. 1, the modified manifest file is transmitted from the media optimizer system 18 to the client 16 as the signal MMF. Thus, the client 16 can be configured to select from one of the bitrates in the modified manifest file for delivery of the media asset 12 from the content provider 14 to the client 16. The selection of the bitrate by the client 16 is provided to the media optimizer system 18, demonstrated as via a signal SEL. Thus, the media optimizer system 18 can facilitate delivery of the media asset 12 to the client 16 at the selected bitrate. As a first example, in response to the selection signal SEL indicating that the client 16 selected one of the predefined bitrates provided in the original manifest file 20, the media optimizer system 18 can facilitate delivery of the media asset 12 normally (e.g., from the content provider via the network interface 24).

As another example, in response to the selection signal SEL indicating that the client 16 selected one of the additional bitrate(s) generated by the policy manager 26, the media optimizer system 18 can facilitate delivery of the media asset 12 at the selected bitrate via the transcoder 28 or from local memory if the media asset 12 has already been transcoded to such bitrate and stored in memory. In this example, the transcoder 28 can transcode the selected at least one additional bitrate based on one of the predefined bitrates provided in the original manifest file 20. For example, the transcoder 28 can transcode to the selected bitrate based on the highest available bitrate provided in the original manifest file 20. Thus, the content provider 14 can deliver the media asset 12 to the media optimizer system at the highest one of the predefined bitrates in the original manifest file 20, demonstrated as MEDIA1. The transcoder 28 can then transcode the media asset 12 to the selected lower bitrate for delivery of the media asset 12 from the media optimizer system 18 to the client 16, demonstrated as MEDIA2.

As an example, the transcoder 28 can be configured to dynamically generate a quality index corresponding to the media asset 12 based on parameters associated with the media asset 12. For example, the transcoder 28 can generate the quality index based on a perceptual quality of the media asset 12 by analyzing metadata associated with the media asset 12, such as bitrate, frame rate, resolution (e.g., width times height), video/audio container format, and/or codec. The quality index can be implemented along with the first and second portions of parameters, as extracted by the parameter extractor 30, to ascertain a set of transcoding parameters. As an example, the transcoding parameters can include a media encoder template ID, an output bitrate, an output resolution, a maximum output compression ratio, a minimum output bitrate, an output frame reduction ratio, and/or a minimum output frame rate. The transcoder 28 can thus implement these transcoding parameters to select one or more transcoding templates (e.g., from a set of available templates) that can be implemented to transcode the selected at least one additional bitrate based on one of the predefined bitrates provided in the original manifest file 20 (e.g., the highest available bitrate). Accordingly, the transcoder 28 can provide a substantially optimized data stream for the client 16 in delivering the media asset 12, such as dynamically based on changing network conditions.

Additionally, as described herein, the transcoded media asset provided by the transcoder 28 can be stored in a memory, along with metadata describing coding parameters of the transcoded video. Thus, the stored transcoded video can be available for subsequent media content requests of the media asset 12 at such selected bitrate or at a lower bitrate. For instance, the policy manager can access the stored media asset and further transcode the stored (previously transcoded) media asset to another bitrate to fulfill a request for a media asset at a bitrate that is lower than the stored bitrate and not provided in the original manifest. The media optimizer system can store any number of media streams transcoded by the transcoder 28 in memory to be available for adaptive streaming over a range of bitrates that can differ from the bitrates of such media assets that are available from the content provider (e.g., as specified in the original manifest file). In other examples, the transcoder 28 can transcode in substantially real time (e.g., on the fly) to provide the output stream at an intermediate selected bitrate that does not exist in the original manifest file. For a given media asset, it is to be understood that the transcoder 28 can select any one of the predefined bitrates specified in the original manifest file 20 that has a higher bitrate than the selected bitrate to which the media asset is being transcoded. That is, the transcoder 28 is not limited to using the absolute highest one of the predefined bitrates in the original manifest file 20 to transcode to the selected, but can use any higher bitrate, such as a next highest one of the predefined bit-rates in the original manifest file 20.

Based on the adaptive generation of the modified manifest file, the client 16 can better and more efficiently optimize receipt of the media asset 12 based on the variety of bitrates that are available in the modified manifest file, as opposed to being limited to the predefined bitrates specified in the original manifest file 20. Therefore, bandwidth in the associated network (e.g., cellular or other network) can be better optimized by allocating lower yet still sufficient bitrates than may be available in the original manifest file 20 for delivery of the media asset 12, as opposed to providing bitrates that may be greater than necessary for providing sufficient user quality in consumption of the associated media asset 12. Additionally, the policy manager 26 can be configured to introduce the additional new bitrates between bitrates specified in the original manifest file 20 to provide for smaller incremental differences in bitrate between consecutive bitrates specified in the modified manifest file. As described herein, the term "consecutive bitrates" defines two bitrates of the plurality of bitrates in the original manifest file 20 or the modified manifest file MMF that are numerically sequential, such that there are no other bitrates in the original manifest file 20 or the modified manifest file MMF that are between them. Therefore, in response to changes in the network conditions, the client's adaptive selection of bitrates from the bitrates specified in the modified manifest file MMF can more accurately reflect the continuing changing current network conditions experienced by the client. As a result, transitions among the available bitrates during ABR streaming can be smoother based on a more granular difference between the bitrates, thereby providing for less noticeable changes in the user experience in the consumption of the media asset 12. Furthermore, because in some examples the transcoded bitrates can be stored locally in memory, portions of the media asset 12 can be cached locally at the associated bitrate to provide a more optimized storage solution while maintaining flexibility in the delivery of the media asset 12 to other clients.

Figure 3:
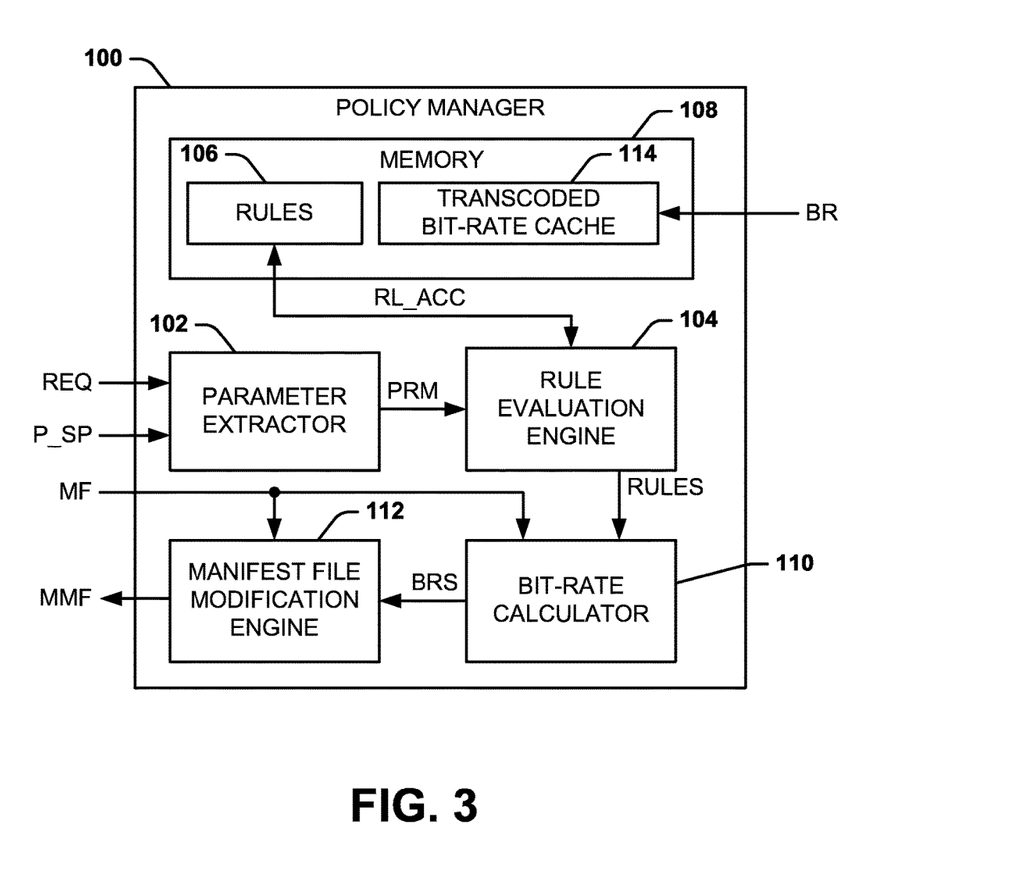
FIG. 3 illustrates an example of a policy manager system.

FIG. 3 illustrates an example of a policy manager system 100. The policy manager 100 can correspond to the policy manager 26 in the example of FIG. 1. Therefore, reference can be made to the example of FIG. 1 in the following description of the example of FIG. 3.

The policy manager 100 includes a parameter extractor 102 that receives the media content request REQ and parameter request response P_SP, similar to as disclosed in the example of FIG. 1. As an example, the parameter request response P_SP can be provided from the service provider 22 in response to a parameter request, such as based on data provided in the media content request REQ. The parameter extractor 102 is thus configured to extract the parameters associated with the media content request REQ and the parameter request response P_SP to generate an aggregate parameter set PRM. As an example, the parameter extractor 102 can determine a first portion of parameters based on information extracted from the media content request REQ, such as from a header of the media content request REQ (e.g., a user agent field, a client identifier). The parameter extractor 102 can determine a second portion of parameters based on information provided from the service provider 22 in the parameter request response P_SP, such as can include subscription information (e.g., data plan specifications, such as bandwidth and/or quality of service requirements). Therefore, the aggregate parameter set PRM can include data associated with the client 16 (e.g., device class, device capabilities, such as screen resolution, screen format, audio requirements), user subscription information (e.g., for a user data plan), the type of media asset requested (e.g., ABR format), the content provider that maintains the media asset, a type of access network for the client, the current network conditions, and/or a variety of other types of data relevant to or affecting possible bitrates for adaptive streaming media to a given client.

The aggregate parameter set PRM and the original manifest file MF, as provided by the content provider 14, are each provided to a rule evaluation engine 104. The rule evaluation engine 104 can generate a set of rules, demonstrated in the example of FIG. 3 as RULES, corresponding to bitrate policies determined based on the aggregate parameter set PRM. For example, the rule evaluation engine 104 can evaluate the aggregate parameter set PRM relative to a predetermined set of rules 106 stored in a memory 108 to generate the rule set RULES. The memory 108 can be configured to store at least a portion of the executable instructions associated with the software routines implemented by the policy manager 100, as described herein.

In the example of FIG. 3, the predetermined set of rules 106 are accessed from the memory 108 via a signal RL_ACC. As an example, the predetermined set of rules 106 can be modified based on changes to the associated network (e.g., via the service provider 22 of FIG. 1).

As another example, the rule evaluation engine 104 can include a preconfigured sequence of match-rule-sets, such as defined in a PatternListGrp XML definition to find a match-rule-set for the aggregate parameter set PRM. The match-rule-sets can be prioritized in an order of evaluation to break ties in ascertaining a most applicable match-rule-set. A first example of a match-rule-set that evaluates a first class of parameters can be expressed as follows in Table 1:

TABLE 1

```
<PatternListGrp id="match-rule-set1">
<BillingPlanIdx>0</BillingPlanIdx>
<DeviceClassGrp>
<DeviceClass>BigScreenDevice</DeviceClass>
</DeviceClassGrp>
<ContentSourceType>HLS</ContentSourceType>
<PartnerGroup>gold-partner</PartnerGroup>
<AccessNetwork>3G</AccessNetwork>
<OnlineOffline>OnlineOnly</OnlineOffline>
```

A second example of a match-rule-set that evaluates a second class of parameters can be expressed as follows in Table 2:

TABLE 2

```
<PatternListGrp id="match-rule-set2">
< BillingPlanIdx>1</BillingPlanIdx>
< DeviceClassGrp>
< DeviceClass>SmallScreenDevice</DeviceClass>
< /DeviceClassGrp>
< ContentSourceType>MSS</ContentSourceType>
< PartnerGroup>silver-partner</PartnerGroup>
< AccessNetwork>4G</AccessNetwork>
< OnlineOffline>OfflineOnly</OnlineOffline>
< /PatternListGrp>
```

After evaluating the aggregate parameter set PRM against all of the match-rule-sets, if the rule evaluation engine 104 does not find a match of the aggregate parameter set PRM with any of the match-rule-sets, the policy manager 100 can facilitate delivery of the media asset 12 to the client 16 based on one of the predefined bitrates in the original manifest file MF.

In response to the aggregate parameter set PRM matching a given one of the match-rule-sets, the rule evaluation engine 104 is configured to map the match into an action rule corresponding to a bitrate policy. As an example, the rule evaluation engine 104 can map multiple match-rule-sets to a given one or more action rules. An example of the mapping of a match-set-rule to a given action rule can be expressed as follows in Table 3:

TABLE 3

```
<PatternGrpList_Action_Map>
< SetParameter matchGroup="match-rule-set1">
< Action>Basic-User-Action</Action>
< /SetParameter>
<SetParameter matchGroup="match-rule-set2">
< Action>Silver-User-Action</Action>
< /SetParameter>
< /PatternGrpList_Action_Map>
```

Similar to as described previously, if the rule evaluation engine 104 cannot map a given match-rule-set to an action, the policy manager 100 can facilitate delivery of the media asset 12 to the client 16 based on one of the predefined bitrates in the original manifest file MF. In other examples, if the evaluation engine 104 cannot determine an exact match, the evaluation engine can employ a default policy or otherwise determine a closest match to determine a corresponding action to establish one or more additional bitrates for delivery of media asset.

The rule set RULES corresponding to the mapped action(s) are provided to a bitrate calculator 110 that is configured to adaptively generate the at least one additional bitrate to be added to the ABR profiles in the original manifest file MF based on the rule set RULES and the original manifest file MF. As an example, the bitrate calculator 110 can specify media optimization parameters that can be used to generate the at least one additional bitrate and/or delete one or more of the predefined bitrates in the original manifest file MF. For example, the bitrate calculator 110 can define a minimum bitrate parameter that should be available in the modified manifest file, a maximum bitrate parameter that should be available in the modified manifest file, and/or a maximum bitrate difference parameter corresponding to a maximum difference between any two adjacent bitrates in the modified manifest file. As an example, the maximum bitrate difference can be different for every range of defined bitrates in the original manifest file MF and/or between any two consecutive bitrates defined in the original manifest file MF.

To generate the at least one additional bitrate, the bitrate calculator 110 can, for example, analyze the original manifest file MF for an acceptable minimum bitrate based on the rule set RULES. If the bitrate calculator 110 determines that the original manifest file MF does not include an acceptable minimum bitrate as provided by the rule set RULES (e.g., less than or equal to the minimum bitrate parameter based on the rule set RULES), the bitrate calculator 110 can generate a new minimum bitrate corresponding to the minimum bitrate parameter. Similarly, the bitrate calculator 110 can, for example, analyze the original manifest file MF for an acceptable maximum bitrate based on the rule set RULES. If the bitrate calculator 110 determines that the original manifest file MF does not include an acceptable maximum bitrate as provided by the rule set RULES, the bitrate calculator 110 can generate a new maximum bitrate corresponding to the maximum bitrate parameter. For example, if the bitrate calculator 110 determines that the maximum bitrate in the original manifest file MF is insufficient, the bitrate calculator 110 can generate the new maximum bitrate corresponding to the maximum bitrate parameter. As another example, if the original manifest file MF includes bitrates that are greater than the maximum bitrate parameter, the bitrate calculator 110 can delete the predefined bitrates in the original manifest file that are greater than the maximum bitrate parameter.

The bitrate calculator 110 can also analyze the bitrate differences between consecutive predefined bitrates in the original manifest file MF. If any of the bitrate differences between the predefined bitrates in the original manifest file MF exceed the maximum bitrate difference parameter, the bitrate calculator 110 can generate one or more additional bitrates having bitrate values between the consecutive predefined bitrates so that the bitrate difference parameter is satisfied for each adjacent pair of bitrates. A first example of an action rule (e.g., for a basic user plan as defined by the rule set RULES) that can be implemented by the bitrate calculator 110 to generate the additional bitrate(s) to be added to the original manifest file MF to generate the modified manifest file can be expressed as in Table 4. In the example of Table 4, the action rule specifies various parameters for ABR video, including a minimum bitrate, a maximum bitrate, a range of bitrates, a maximum rate difference (e.g., step size) for a low end bitrate range, and a maximum rate difference for an upper bitrate range.

TABLE 4

```
<Rule_SetAction name="Basic-User-Action">
<SetParameter name="ABR-Video">
<MinRate>200kbps</MinRate>
<MaxRate>2000kbps</MaxRate>
<RateRangeStartEnd>200kbps-1000kbps</RateRangeStartEnd>
<MaxRateDifference>300kbps</MaxRateDifference>
<RateRangeStartEnd>1000kbps-2000kbps</RateRangeStartEnd>
<MaxRateDifference>500kbps</MaxRateDifference>
</SetParameter>
</Rule_SetAction>
```

A second example of an action rule (e.g., for a silver user plan as defined by the rule set RULES) that can be implemented by the bitrate calculator 110 to generate the additional bitrate(s) to be added to the original manifest file MF to generate the modified manifest file can be expressed as in Table 5. Thus in the example, of Table 5, similar parameters are specified as in Table 4, except the maximum rate differences are smaller and the maximum bitrate is also higher since the action rule is established for a higher level of service for ABR video streaming. Different action rules and/or parameters could be utilized for accommodating other levels of service plans (e.g., gold plan, platinum plan etc.) from those shown in the examples of Tables 4 and 5. In each such plan, the differences between consecutive bitrates can be established as a function of each respective rate range. While two such rate ranges (e.g., a low range and a higher range) are demonstrated in the examples of Tables 4 and 5, any number of one or more rate ranges can be established and respective rate ranges can be established for each such range.

TABLE 5

```
<Rule_SetAction name="Silver-User-Action">
<SetParameter name="ABR-Video">
<MinRate>300kbps</MinRate>
<MaxRate>3000kbps</MaxRate>
<RateRangeStartEnd>300kbps-1300kbps</RateRangeStartEnd>
<MaxRateDifference>250kbps</MaxRateDifference>
<RateRangeStartEnd>1300kbps-2000kbps</RateRangeStartEnd>
<MaxRateDifference>350kbps</MaxRateDifference>
<RateRangeStartEnd>2000kbps-3000kbps</RateRangeStartEnd>
<MaxRateDifference>500kbps</MaxRateDifference>
</SetParameter>
</Rule_SetAction>
```

The bitrate calculator 110 provides modifications to the original manifest file MF (e.g., including added bitrates and deleted bitrates) to a manifest file modification engine 112. In the example of FIG. 3, the modifications are demonstrated as a signal BRS. The manifest file modification engine 112 is configured to modify the original manifest file MF, such as by adding the at least one additional bitrate and/or deleting one or more of the predefined bitrates (e.g., the highest bitrate(s)) to and/or from the original manifest file MF. Therefore, the manifest file modification engine 112 can generate the modified manifest file MMF that is transmitted to the client 16 for selection of a most optimal bitrate for delivery of the media asset 12. As an example, the manifest file modification engine 112 can generate the modified manifest file MMF as a new ".txt" file (e.g., an XML document or another mark-up language) based on the original manifest file MF and the modifications BRS. Alternatively, the manifest file modification engine 112 can modify the original manifest file MF based on the modifications BRS to transmit the original manifest file MF to the client 16 as the modified manifest file MMF.

In response to selection by the client (e.g., by an ABR client application executed therein) 16 of at least one additional bitrate that is provided in the modified manifest file MMF and not present in the original manifest file, the media optimizer system 18 can enable delivery of the media asset 12 at the selected bitrate. As disclosed herein, the selected bitrate can be generated via the transcoder 28, as disclosed herein. For example, the transcoder 28 can transcode the selected additional bitrate in real time based on one of the predefined bitrates provided in the original manifest file 20 (e.g., the highest one of the predefined bitrates in the original manifest file MF).

In addition to creation/deletion of the at least one additional bitrate, the rule evaluation engine 104 can also be configured to evaluate the aggregate parameter set PRM to generate one or more transcoding templates for the transcoding of at least one additional bitrate based on the rule set RULES. For example, the transcoder 28 can generate a quality index based on a perceptual quality of the media asset 12 by analyzing metadata associated with the media asset 12, such as bitrate, frame rate, resolution (e.g., width times height), video/audio container format, and/or codec. The rule evaluation engine 104 can thus implement the quality index to evaluate the aggregate parameter set PRM in a manner similar to as described previously in Tables 1-3 to generate one or more transcoding templates for delivery of the media asset 12. The resulting templates to be used for transcoding the media.

A first example of a match-rule-set that evaluates a first class of the parameters for generating the transcoding template can be expressed as follows in Table 6:

TABLE 6

```
<PatternListGrp id="match-rule-set1">
<AdaptationProfileIdx>0</AdaptationProfileIdx>
<DeviceClassGrp>
<DeviceClass>BigScreenDevice</DeviceClass>
</DeviceClassGrp>
<InputResolutionRange>
<Width>1200-6000</Width>
<Height>700-4000</Height>
</InputResolutionRange>
<InputVideoRateStartEnd>500000-
1000000</InputVideoRateStartEnd>
<InputVideoFrameRateStartEnd>20-
50</InputVideoFrameRateStartEnd>
<ContentSourceType>mp4</ContentSourceType>
<PartnerGroup>gold-partner</PartnerGroup>
<AccessNetwork>3G</AccessNetwork>
```

TABLE 6-continued

```
<OnlineOffline>OnlineOnly</OnlineOffline>
</PatternListGrp>
```

A second example of a match-rule-set that evaluates a second class of parameters for generating the transcoding template can be expressed as follows in Table 7:

TABLE 7

```
<PatternListGrp id="match-rule-set2">
<AdapatationProfileIdx>1</AdapatationProfileIdx>
<DeviceClassGrp>
<DeviceClass>SmallScreenDevice</DeviceClass>
</DeviceClassGrp>
<ContentSourceType>flv</ContentSourceType>
<PartnerGroup>silver-partner</PartnerGroup>
<AccessNetwork>4G</AccessNetwork>
<OnlineOffline>OfflineOnly</OnlineOffline>
</PatternListGrp>
```

After evaluating the aggregate parameter set PRM against all of the match-rule-sets, if the rule evaluation engine 104 does not find a match of the aggregate parameter set PRM with any of the match-rule-sets, the policy manager 100 can facilitate delivery of the media asset 12 in a non-optimized manner to the client 16, such as based on one of the predefined bitrates in the original manifest file MF.

In response to matching a rule set with a set of the aggregate parameters PRM, the rule evaluation engine 104 can map the match into an action to generate a set of optimization parameters to achieve a maximum possible compression without compromising the quality of the original media asset 12. As an example, the rule evaluation engine 104 can map multiple match-rule sets to the same action. The mapping of the match into an action can be performed substantially similar to as described previously in Tables 4 and 5. As an example, an action can specify optimal media optimization parameters that can be passed to the transcoder 28, along with the media asset 12, to achieve compressed/optimized media without compromising the quality. An example of a mapped action that specifies media optimization parameters for generating a transcoding template is provided in Table 8:

TABLE 8

```
<Rule_SetAction name="Basic-User-Action">
<SetParameter name="Progressive-Video">
<MaxCompressionRatio>50</MaxCompressionRatio>
<Resolution>320x240</Resolution>
<MinBitRate>200000</MinBitRate>
<OutputBitRate>300000</OutputBitRate>
<OutputFrameRate>15</OutputFrameRate>
</SetParameter>
</Rule_SetAction>
```

Therefore, in response to the transcoder 28 receiving the transcoding template that includes the mapped transcoding parameters, the transcoder 28 can optimize transcoding of the media asset 12 to provide an optimized delivery of the media asset 12 to the client 16.

In the example of FIG. 3, the media asset 12 being delivered at the transcoded bitrate BR can also be stored in a transcoded bitrate cache 114, such as provided by the transcoder 28. For example, in response to a plurality of requests for the same media asset 12 at the same additional bitrate provided in the modified manifest file MMF, the media optimizer system 18 can command storage of the media asset 12 or portions of the media asset 12 at the respective bitrate BR in the transcoded bitrate cache 114. As an example, the at least a portion of the media asset 12 can be stored at the bitrate BR in response to a subsequent quantity of media content requests REQ exceeding a predetermined popularity threshold (e.g., stored in the memory 108). Therefore, a particularly popular media asset 12 can be more optimally stored and more readily accessible for subsequent delivery to clients over the network 11.

The media optimizer system 18 can also be configured to access the selected bitrate from the memory 108 if the selected bitrate has been previously transcoded and stored in the memory 108. As yet another alternative, if the selected bitrate corresponds to one of the bitrates in the original manifest file MF, the media optimizer system 18 can deliver the selected bitrate, such as directly from the content provider 14 at the original bitrate or, in some examples, from the memory 108 if the original bitrate stream has been cached locally.

Figure 4:
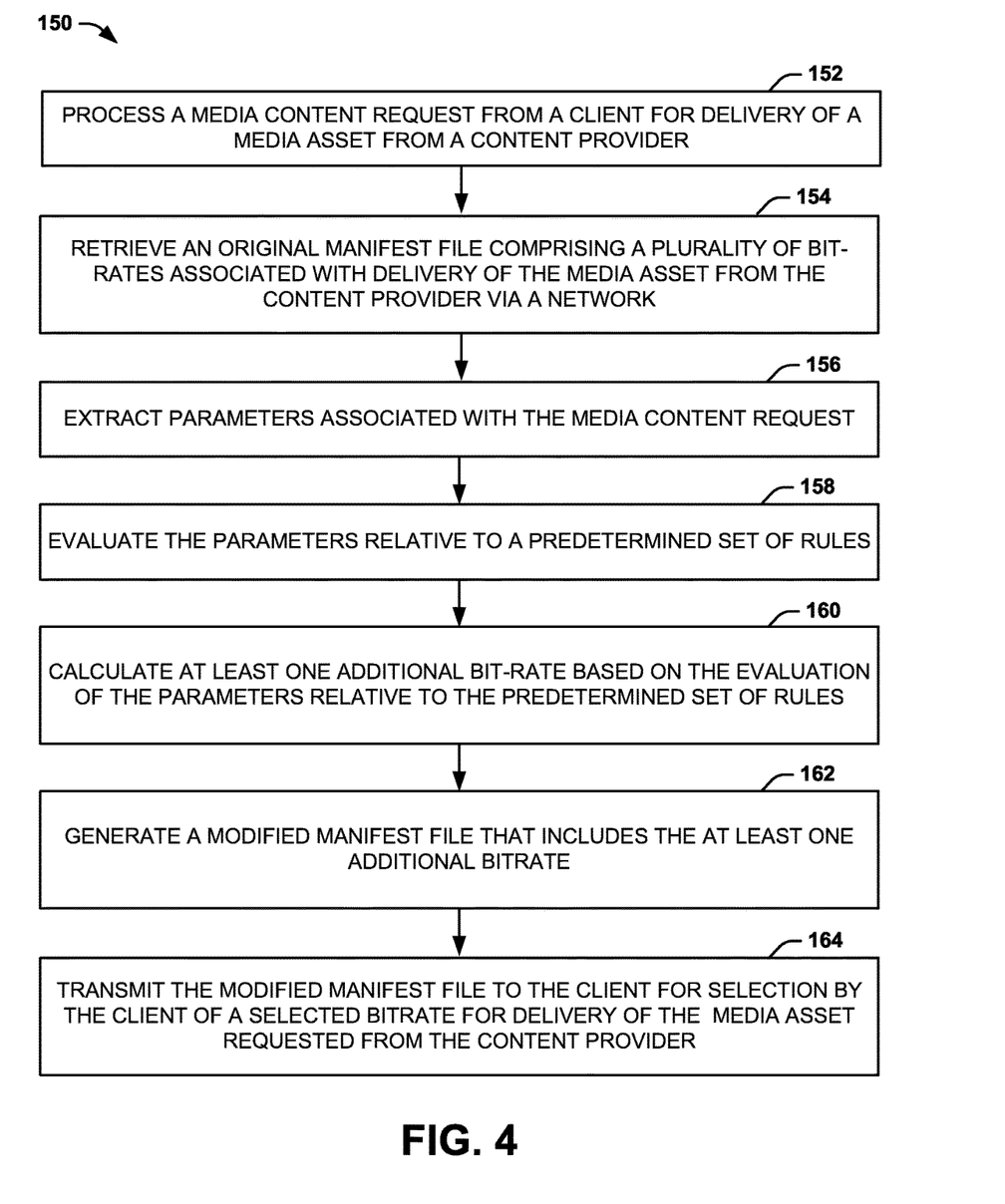
FIG. 4 an example of a method for adaptively modifying an original manifest file.

In view of the foregoing structural and functional features described above, methods that can be implemented will be better appreciated with reference to FIG. 4. While, for purposes of simplicity of explanation, the method of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as instructions stored in a non-transitory storage medium as well as be executed by a processor of a computer device or special purpose media distribution device (e.g., a digital content manager), for example.

FIG. 4 illustrates an example of a method 150 adaptively modifying an original manifest file. The method 150 can be implemented by a policy manager, such as the policy manager 26 in the example of FIG. 1 or the policy manager 100 in the example of FIG. 3. At 152, a media content request (e.g., the media content request REQ) from a client (e.g., the client 16) for delivery of a media asset (e.g., the media asset 12) from a content provider (e.g., the content provider 14) is processed. The media content request can be received via a network interface in an associated media optimizer system (e.g., the media optimizer system 18) that is associated with a service provider (e.g., the service provider 22). At 154, an original manifest file (e.g., the original manifest file 20) comprising a plurality of bitrates associated with delivery of the media asset is received from the content provider via a network (e.g., the network 11, which can be the Internet).

At 156, parameters (e.g., the parameter set PRM) associated with the media content request are extracted. As an example, the parameters can include parameters extracted from the media content request and parameters provided from the service provider 22. At 158, the parameters are evaluated relative to a predetermined set of rules (e.g., the predetermined rules 106 stored in the memory 108). At 160, at least one additional bitrate is calculated based on the evaluation of the parameters relative to the predetermined set of rules. At 162, a modified manifest file (e.g., the modified manifest file MMF generated by the manifest file modification engine 112) is generated that includes the at least one additional bitrate. At 164, the modified manifest file is transmitted to the client for selection by the client of a bitrate associated with delivery of the associated media asset requested from the content provider. The delivery of the media asset can be at a bitrate that is transcoded by the transcoder 28 in response to selection of one of the at least one additional bit rate in the modified manifest file.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system comprising a processor configured to execute:
    a media optimizer comprising a network interface, a policy manager, and a transcoder, wherein the network interface is configured to:
        receive a request for a media asset from a client based on an original manifest file, the media asset provided from a content provider, the original manifest file specifying a plurality of bitrates;
        extract parameters associated with the media content request, wherein the network interface being configured to extract the parameters comprises the network interface being configured to:
            extract a first portion of the parameters from the received request, the first portion comprising an access type and an adaptive bitrate type, and
            extract a second portion of the parameter from the received request, the second portion comprising data identifying the client;
    wherein the policy manager is configured to evaluate the extracted parameters relative to a predetermined set of rules and generate at least one additional bitrate in addition to the plurality of bitrates based on the evaluation, wherein the at least one additional bitrate provides for an incremental difference between a first bitrate and a second bitrate of the plurality of bitrates, and wherein the first bitrate and the second bitrate are numerically sequential bitrates having no other bitrates in between in the original manifest file;
    wherein the transcoder is configured to adaptively modify the original manifest file to include the at least one additional bitrate and generate the modified manifest file; and
    wherein the network interface is configured to transmit the modified manifest file to the client.

2. The system of claim 1, wherein the policy manager is further configured to determine the at least one additional bitrate based on applying the bitrate policies to the extracted parameters, and to add the at least one additional bitrate to the plurality of bitrates in the original manifest file.

3. The system of claim 2, wherein the transcoder is further configured to transcode the media asset to a selected bitrate based on one of the plurality of bitrates in the original manifest file for the delivery of the media asset at the selected bitrate to the client in response to the client selecting one of the at least one additional bitrate as the selected bitrate.

4. The system of claim 3, wherein the transcoder is configured to transcode the media asset to the selected bitrate for the delivery of the media asset from a highest one of the plurality of bitrates specified in the original manifest file.

5. The system of claim 3, wherein the media optimizer further comprises a memory configured to store the media asset that has been transcoded to the selected bitrate, wherein the media optimizer is configured to deliver the stored transcoded media asset to another client in response to a subsequent media content request for the respective associated media asset at or below the selected bitrate.

6. The system of claim 2, wherein the policy manager is configured to apply the bitrate policies based on the extracted parameters to adaptively generate the at least one additional bitrate between consecutive bitrates in the modified manifest file relative to the original manifest file based on a bitrate difference between the consecutive bitrates exceeding a maximum bitrate difference parameter associated with the bitrate policies.

7. The system of claim 2, wherein the media optimizer is configured to delete at least one of the plurality of bitrates in the original manifest file based on the at least one of the plurality of bitrates in the original manifest file being less than a minimum bitrate parameter associated with the bitrate policies or greater than a maximum bitrate parameter associated with the bitrate policies.

8. The system of claim 1, wherein, in response to the client selecting one of at least one additional bitrate from the modified manifest file, the media optimizer is configured to transcode the associated media asset to the selected bitrate based on one of the plurality of bitrates specified in the original manifest file to enable the delivery of the associated media asset from the content provider to the client, the at least one additional bitrate being generated by the media optimizer based on application of the bitrate policies.

9. The system of claim 1, wherein, in response to the client selecting one of the plurality of bitrates specified in the original manifest file, the media optimizer is configured to enable the delivery of the associated media asset from the content provider to the client at the selected one of the plurality of bitrates in the original manifest file.

10. The system of claim 1, wherein the parameters comprises header data associated with the media content request and data provided by a service provider associated with the client.

11. A method comprising:
    processing a media content request from a client for delivery of a media asset from a content provider;
    retrieving an original manifest file comprising a plurality of bitrates associated with the media asset, the manifest file received from the content provider via a first network;
    extracting parameters associated with the media content request, wherein extracting the parameters comprises:
        extracting a first portion of the parameters from the received request, the first portion comprising an access type and an adaptive bitrate type, and
        extracting a second portion of the parameter from the received request, the second portion comprising data identifying the client;
    evaluating the extracted parameters relative to a predetermined set of rules;
    calculating at least one additional bitrate in addition to the plurality of bitrates based on the evaluation of the extracted parameters relative to the predetermined set of rules, wherein the at least one additional bitrate provides for an incremental difference between a first bitrate and a second bitrate of the plurality of bitrates, and wherein the first bitrate and the second bitrate are numerically sequential bitrates having no other bitrates in between in the original manifest file;

generating a modified manifest file that includes the at least one additional bitrate; and transmitting the modified manifest file to the client for selection by the client of a selected bitrate for delivery of the media asset.

12. The method of claim 11, further comprising:

transcoding the media asset to the selected bitrate based on one of the plurality of bitrates in the original manifest file in response to the client selecting one of the at least one additional bitrate; and enabling the delivery of the media asset requested from the content provider to the client at the selected bitrate.

13. The method of claim 12, wherein transcoding the media asset to the selected bitrate comprises transcoding the selected bitrate for the delivery of the media asset from the content provider to the client based on a highest one of the plurality of bitrates specified in the original manifest file for the media asset.

14. The method of claim 12, further comprising:

storing the transcoded bitrate in a memory; and accessing the stored transcoded bitrate from the memory to fulfill a subsequent media content request for the respective associated media asset at the selected bitrate or a lower bitrate.

15. The method of claim 11, wherein extracting parameters associated with the media content request further comprises:

extracting the first portion of the parameters from a header of the media content request; and retrieving the second portion of the parameters from a service provider associated with the client.

16. A media optimizer system comprising:

a network interface configured to receive a request for a media asset from a client, the media asset associate with an original manifest file specifying a plurality of bitrates for the media asset;

a policy manager comprising a processor configured to execute:

a parameter extractor configured to extract parameters associated with the media content request, wherein the parameter extractor being configured to extract the parameters comprises the parameter extractor configured to:

extract a first portion of the parameters from the received request, the first portion comprising an access type and an adaptive bitrate type, and extract a second portion of the parameter from the received request, the second portion comprising data identifying the client;

a rule evaluation engine configured to evaluate the extracted parameters based on a predetermined set of rules;

a bitrate calculator configured to adaptively generate at least one additional bitrate in addition to the plurality of bitrates based on the evaluation, wherein the at least one additional bitrate provides for an incremental difference between a first bitrate and a second bitrate of the plurality of bitrates, and wherein the first bitrate and the second bitrate are numerically sequential bitrates having no other bitrates in between in the original manifest file; and a manifest file modification engine configured to add the at least one additional bitrate to the plurality of bitrates in the original manifest file and generate a modified manifest file, wherein the policy manager is further configured to send the modified manifest file to the client via the network interface.

17. The system of claim 16, further comprising a transcoder executed by the processor to transcode the media asset to a selected bitrate based on a highest one of the plurality of bitrates specified in the original manifest file for the delivery of the media asset from the content provider to the client at the selected bitrate.

18. The system of claim 17, wherein the policy manager further comprises a memory configured to store the transcoded media asset at a selected bitrate based on a quantity of prior media content requests for the media asset exceeding a predetermined popularity threshold, wherein the policy manager provides the stored transcoded media asset from the memory at the selected bitrate in response to a subsequent media content request for the respective associated media asset.

19. The system of claim 16, wherein the parameter extractor is configured to extract the first portion of the parameters from a header of the request and to retrieve the second portion of the parameters from a service provider associated with the client.

* * * * *